(12) United States Patent
Huang et al.

(10) Patent No.: US 7,749,340 B2
(45) Date of Patent: Jul. 6, 2010

(54) TECHNIQUE FOR INCREASING THE COMPLIANCE OF LEAD-FREE SOLDERS CONTAINING SILVER

(75) Inventors: Benlih Huang, New Hartford, NY (US); Hong-Sik Hwang, Clinton, NY (US); Ning-Cheng Lee, New Hartford, NY (US)

(73) Assignee: Indium Corporation of America, Utica, NY (US)

( * ) Notice: Subject to any disclaimer, the term of this patent is extended or adjusted under 35 U.S.C. 154(b) by 141 days.

(21) Appl. No.: 11/550,640

(22) Filed: Oct. 18, 2006

(65) Prior Publication Data

US 2007/0092396 A1 Apr. 26, 2007

Related U.S. Application Data (60) Provisional application No. 60/729,245, filed on Oct. 24, 2005.

(51) Int. Cl.
C22C 13/00 (2006.01)
C22C 13/02 (2006.01)
B23K 35/34 (2006.01)
C23C 22/00 (2006.01)

(52) U.S. Cl. .................. 148/400; 148/23; 148/241; 148/421; 420/560; 420/561; 420/562

(58) Field of Classification Search .............. None
See application file for complete search history.

(56) References Cited

U.S. PATENT DOCUMENTS

| | | | |
|---|---|---|---|
| 3,087,813 A | 4/1963 | Ueno et al. | |
| 2002/0175403 A1 | 11/2002 | Sreeram et al. | |
| 2003/0133826 A1* | 7/2003 | Lin et al. | 420/557 |
| 2008/0159903 A1* | 7/2008 | Lewis et al. | 420/561 |

FOREIGN PATENT DOCUMENTS

JP 2003211283 A * 7/2003

OTHER PUBLICATIONS

George E. Dieter, "Mechanical Metallurgy", p. 478, 221-225, 1976.
Kang, et al., "Microstructure and Mechanical Properties of Lead-free Solders and Solder Joints used in Microelectronic Applications", IBM Journal of Research and Development, retrieved from the internet at http://researchweb.watson.ibm.com/journal/rd/494/kang.html, retrieved from the internet on Sep. 16, 2005.

(Continued)

*Primary Examiner*—Melvin C Mayes
*Assistant Examiner*—Sarah Van Oudenaren
(74) *Attorney, Agent, or Firm*—Sheppard Mullin Richter & Hampton LLP (57) ABSTRACT

A technique for technique for increasing the compliance of lead-free solders containing silver is disclosed. In one particular exemplary embodiment, the technique may be realized as a Sn—Ag—Al alloy composition comprising (0.01-20)% Ag, (0.01-2)% Al, balanced with Sn. In another particular exemplary embodiment, the technique may be realized as a Sn—Ag—Cu—Al alloy composition comprising (0.01-20)% Ag, (0.01-1)% Cu, (0.01-2)% Al, balanced with Sn. In still another particular exemplary embodiment, the technique may be realized as a Sn—Ag—Al—Ni composition comprising (0.01-20)% Ag, (0.01-2)% Al, (0.01-4)% Ni, balanced with Sn. In yet another particular exemplary embodiment, the technique may be realized as a Sn—Ag—Cu—Al—Ni alloy composition comprising (0.01-20)% Ag, (0.01-1)% Cu, (0.01-2)% Al, (0.01-4)% Ni, balanced with Sn.

28 Claims, 9 Drawing Sheets

| Alloy | Solidus temperature (°C) | Liquidus temperature (°C) | Pasty range (°C) | Yield strength (ksi) | Ductility (%) |
|---|---|---|---|---|---|
| Sn-4Ag-0.5Cu (SAC405) | 215.3 | 218.2 | 2.9 | 6.0 | 17.3 |
| Sn-3.8Ag-0.7Cu (SAC387) | 215.3 | 218.3 | 3 | 6.3 | 16.4 |
| Sn-3Ag-0.5Cu (SAC305) | 215.5 | 218.6 | 3.1 | 5.3 | 19.3 |
| Sn-2Ag-0.5Cu (SAC205) | 215.6 | 222.4 | 6.8 | 5.1 | 15.2 |
| Sn-1.5Ag-0.5Cu (SAC1505) | 216 | 223.6 | 7.6 | 4.3 | 17.5 |
| Sn-1Ag-0.5Cu (SAC105) | 214.8 | 225 | 10.2 | 3.4 | 13.4 |

OTHER PUBLICATIONS

Tanaka, et al., "Development of Micro-structured Sn-2Ag-0.1Al Solder with Highly Thermal Fatigue Durability", retrieved from the internet at eprints.lib.hokudai.ac.jp/dspace/bitstream/2115/447/1/Berlin2004.

Lin, et al., "Microstructural Evolution of Sn-Ag-Cu-Al Solder with Respect to Al Content and Heat Treatment", J. Mater. Res., vol. 17, No. 9, p. 2386-2393, Sep. 2002.

Kariya, et al., "Effect of Silver Content on the Shear Fatigue Properties of Sn-Ag-Cu Flip-Chip Interconnects", Journal of Electronic Materials, vol. 33, No. 4, p. 321-328, 2004.

Ebersberger, et al., "Qualification of SnAg Bumps for Lead-Free Flip Chip Applications", Electronic Components and Technology Conference, p. 683-691, 2004.

* cited by examiner

| Alloy | Solidus temperature (°C) | Liquidus temperature (°C) | Pasty range (°C) | Yield strength (ksi) | Ductility (%) |
|---|---|---|---|---|---|
| Sn-4Ag-0.5Cu (SAC405) | 215.3 | 218.2 | 2.9 | 6.0 | 17.3 |
| Sn-3.8Ag-0.7Cu (SAC387) | 215.3 | 218.3 | 3 | 6.3 | 16.4 |
| Sn-3Ag-0.5Cu (SAC305) | 215.5 | 218.6 | 3.1 | 5.3 | 19.3 |
| Sn-2Ag-0.5Cu (SAC205) | 215.6 | 222.4 | 6.8 | 5.1 | 15.2 |
| Sn-1.5Ag-0.5Cu (SAC1505) | 216 | 223.6 | 7.6 | 4.3 | 17.5 |
| Sn-1Ag-0.5Cu (SAC105) | 214.8 | 225 | 10.2 | 3.4 | 13.4 |

Figure 1

| Alloy | Solidus temperature (°C) | Liquidus temperature (°C) | Pasty range (°C) | Yield strength (ksi) | Ductility (%) |
|---|---|---|---|---|---|
| Sn-4Ag-0.5Cu (SAC405) | 215.3 | 218.2 | 2.9 | 6.0 | 17.3 |
| Sn-1.5Ag-0.5Cu (SAC1505) | 216 | 223.6 | 7.6 | 4.3 | 17.5 |
| Sn-4Ag-0.58Cu-0.6Al-0.04Ni | 221.9 | 225.1 | 3.2 | 4.1 | 14.3 |
| Sn-4.23Ag-0.33Cu-0.48Al-0.038Ni | 219.8 | 223 | 3.2 | 4.7 | 17.2 |
| Sn-3.75Ag-0.59Cu-0.31Al-0.049Ni | 219.6 | 223.9 | 4.3 | 4.3 | 20.2 |
| Sn-3.9Ag-0.62Cu-0.15Al-0.05Ni | 215.8 | 219.9 | 4.1 | 4.2 | 13.7 |
| Sn-4Ag-0.64Cu-0.07Al-0.05Ni | 215.5 | 217.9 | 2.4 | 5.5 | 11.4 |

Figure 2

| Alloy | Solidus temperature (°C) | Liquidus temperature (°C) | Pasty range (°C) | Yield strength (ksi) | Ductility (%) |
|---|---|---|---|---|---|
| Sn-3Ag-0.5Cu (SAC305) | 215.5 | 218.6 | 3.1 | 5.3 | 19.3 |
| Sn-3.18Ag-0.46Cu-0.88Al-0.047Ni | 218.9 | 227.9 | 9 | 5.9 | 10.9 |
| Sn-3.18Ag-0.51Cu-0.49Al-0.031Ni | 219.5 | 225 | 5.5 | 4.2 | 12.0 |

Figure 3

| Alloy | Solidus temperature (°C) | Liquidus temperature (°C) | Pasty range (°C) | Yield strength (ksi) | Ductility (%) |
|---|---|---|---|---|---|
| Sn-2.9Ag-0.5Cu-0.294Al-0.018Ni | 219.6 | 223 | 3.4 | 4.0 | 16.0 |
| Sn-2.47Ag-0.5Cu-0.196Al-0.012Ni | 219.6 | 221 | 1.4 | 3.96 | 20.2 |
| Sn-1.65Ag-0.5Cu-0.15Al-0.009Ni | 218.9 | 222.2 | 3.3 | 3.9 | 17.6 |

Figure 4

| Alloy | Solidus temperature (°C) | Liquidus temperature (°C) | Pasty range (°C) | Yield strength (ksi) | Ductility (%) |
|---|---|---|---|---|---|
| Sn-3.8Ag-0.7Cu (SAC387) | 215.3 | 218.3 | 3 | 6.3 | 16.4 |
| Sn-3.8Ag-0.7Cu-2Ni-0.05Al | 217.5 | 220 | 2.5 | 5.0 | 4.26 |
| Sn-3.8Ag-0.7Cu-0.05Ni-2Al | 223.9 | 231.9 | 8 | 6.2 | 9.33 |

Figure 5

| Alloy | Solidus temperature (°C) | Liquidus temperature (°C) | Pasty range (°C) | Yield strength (ksi) | Ductility (%) |
|---|---|---|---|---|---|
| Sn-2.47Ag-0.5Cu-0.196Al-0.012Ni | 219.6 | 221 | 1.4 | 3.96 | 20.2 |
| Sn-3.59Ag-0.13Cu-0.192Al | 219.5 | 222.7 | 3.2 | 3.97 | 13.53 |

TECHNIQUE FOR INCREASING THE COMPLIANCE OF LEAD-FREE SOLDERS CONTAINING SILVER

CROSS-REFERENCE TO RELATED APPLICATIONS

This patent application claims priority to U.S. Provisional Patent Application No. 60/729,245, filed Oct. 24, 2005, which is hereby incorporated by reference herein in its entirety.

FIELD OF THE DISCLOSURE

The present disclosure relates generally to solder compositions for use in electronics and, more particularly, to a technique for increasing the compliance of lead-free solders containing silver.

BACKGROUND OF THE DISCLOSURE

Lead free solder alloys containing Silver (Ag) (e.g., Tin (Sn)—Silver (Ag) and Tin (Sn)—Silver (Ag)—Copper (Cu) alloys) have been considered as one of the most promising replacements for solders containing Lead (Pb) for microelectronics applications. However, due to the rigidity of Sn—Ag and Sn—Ag—Cu alloys, compared with Pb-containing alloys, more component failures have been found in flip-chip and ball grid array (BGA) applications, where high stresses are developed. In addition, the high rigidity of these alloys have resulted in more high impact and drop induced interconnect failures for portable electronic devices, such as personal data assistants (PDA), notebook computers, etc.

Reducing the Ag concentration in Sn—Ag (B. Ebersberger et al., "Qualification of SnAg Solder Bumps for Lead-Free Flip Chip Applications", Proceedings of IEEE Electronic Components and Technology Conference (ECTC), Las Vegas, 2004, pp. 683-691) and Sn—Ag—Cu alloys (Yoshiharu Kariya et al., "Effect of Silver Content on the Shear Fatigue Properties of Sn—Ag—Cu Flip-Chip Interconnects", Journal of Electronic Materials, Vol. 33, No. 4, 2004, pp. 321-328) has resulted in more ductile and compliant solders for high stress conditions. However, Sn—Ag and Sn—Ag—Cu alloys containing reduced concentrations of Ag exhibit poor fatigue performance. In addition, the pasty range (i.e., the difference between the solidus and liquidus temperatures) of Sn—Ag and Sn—Ag—Cu alloys increases with decreasing Ag content and thus results in higher defect rates (see, S. K. Kang et al., "Microstructure and Mechanical Properties of Lead-Free Solders and Solder Joints Used in Microelectronic Applications", IBM Journal of Research and Development, on-line publication: http:/researchweb.watson.ibm.com/journal/rd/494/kang.html).

In view of the foregoing, it would be desirable to provide a technique for increasing the compliance of Sn—Ag and Sn—Ag—Cu alloys without unduly increasing the pasty range and sacrificing fatigue resistance.

SUMMARY OF THE DISCLOSURE

A technique for increasing the compliance of lead-free solders containing silver is disclosed. In one particular exemplary embodiment, the technique may be realized as a Sn—Ag—Al alloy composition comprising (0.01-20)% Ag, (0.01-2)% Al, balanced with Sn. In another particular exemplary embodiment, the technique may be realized as a Sn—Ag—Cu—Al alloy composition comprising (0.01-20)% Ag, (0.01-1)% Cu, (0.01-2)% Al, balanced with Sn. In still another particular exemplary embodiment, the technique may be realized as a Sn—Ag—Al—Ni composition comprising (0.01-20)% Ag, (0.01-2)% Al, (0.01-4)% Ni, balanced with Sn. In yet another particular exemplary embodiment, the technique may be realized as a Sn—Ag—Cu—Al—Ni alloy composition comprising (0.01-20)% Ag, (0.01-1)% Cu, (0.01-2)% Al, (0.01-4)% Ni, balanced with Sn.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

In contrast to the conventional belief that doping Aluminum (Al) or Nickel (Ni) elements to Sn—Ag and/or Sn—Ag—Cu alloys would result in a strengthening effect, the present disclosure reveals that at preferred ranges alloying Al and/or Ni to Sn—Ag and/or Sn—Ag—Cu alloys results in a drastic decrease in the strength and a great increase of the compliance of the alloys. In particular, by utilizing Al to react with strengthening Ag and Cu elements to form Al—Ag and Al—Cu particles, which are less effective than the replaced $Ag_3Sn$ and $Cu_6Sn_5$ particles in strengthening Sn—Ag and Sn—Ag—Cu alloys, respectively, the resulting Sn—Ag—Al and Sn—Ag—Cu—Al solders have a lower yield strength and a greater softness. Thus, these doped alloys are capable of withstanding high stresses in electronic devices. Furthermore, the Al—Ag and Al—Cu particles are homogeneously distributed in these doped alloy matrices and thus may improve creep and thermal fatigue performance of Sn—Ag and Sn—Ag—Cu alloys.

One embodiment of the invention is a lead free solder alloy comprising from about 78.0% to about 99.98% by weight tin (Sn), from about 0.01% to about 20.0% by weight silver (Ag), and from about 0.01% to about 2.0% by weight aluminum (Al). Another embodiment of the invention is a lead free solder alloy comprising from about 77.0% to about 99.97% by weight tin (Sn), from about 0.01% to about 20.0% by weight silver (Ag), from about 0.01% to about 1.0% by weight copper (Cu), and from about 0.01% to about 2.0% by weight aluminum (Al). A further embodiment of the invention is a lead free solder alloy comprising from about 74.0% to about 99.97% by weight tin (Sn), from about 0.01% to about 20.0% by weight silver (Ag), from about 0.01% to about 2.0% by weight aluminum (Al), and from about 0.01% to about 4.0% by weight nickel (Ni). Another embodiment of the invention is a lead free solder alloy comprising from about 73.0% to about 99.96% by weight tin (Sn), from about 0.01% to about 20.0% by weight silver (Ag), from about 0.01% to about 1.0% by weight copper (Cu), from about 0.01% to about 2.0% by weight aluminum (Al), and from about 0.01% to about 4.0% by weight nickel (Ni).

Although some Al-doped Sn—Ag-(0.1)Al and Sn—Ag—Cu-(0.1)Al compositions have been investigated for thermal fatigue performance (see, Junichi Tanaka et al., "Development of Micro-Structured Sn-2Ag-0.1Al Solder with Highly Thermal Fatigue Durability", on-line publication in Japan: eprints.lib.hokudai.ac.jp/dspace/bitstream/2115/447/1/Berlin2004), and compositions of (2.53-3.10)% Ag, (0.33-0.41)% Cu, and (0.1-0.45)% Al, balanced with Sn were also investigated for micro-structural investigations (see, Kwang-Lung Lin et al., "Micro-Structural Evolution of Sn—Ag—Cu—Al Solder with Respect to Al Content and Heat Treatment", Journal of Materials Research, 17 (8), September, 2002, pp. 2386-2393), the present disclosure reveals that, in contrast to conventional beliefs, the yield strength of Sn—Ag and Sn—Ag—Cu alloys can be greatly reduced by modifying the alloys with Al at preferred ranges. Furthermore, not only is compliance greatly improved, but the pasty range of the Al-modified alloys is found to be comparable to the original Sn—Ag and Sn—Ag—Cu alloys. The present disclosure further reveals that the compliance of these Al-modified Sn—Ag and Sn—Ag—Cu alloys can be further improved with additional doping of Ni without a measurable increase of the liquidus temperature of these alloys.

Thus, the present disclosure relates to a technique for increasing the compliance and reducing the yield strength of lead-free solders containing silver (e.g., Sn—Ag and Sn—Ag—Cu alloys). Preferred alloy compositions are as follows:

a.) A Sn—Ag—Al alloy composition comprising (0.01-20)% Ag, (0.01-2)% Al, balanced with Sn.
b.) A Sn—Ag—Cu—Al alloy composition comprising (0.01-20)% Ag, (0.01-1)% Cu, (0.01-2)% Al, balanced with Sn.
c.) A Sn—Ag—Al—Ni composition comprising (0.01-20)% Ag, (0.01-2)% Al, (0.01-4)% Ni, balanced with Sn.
d.) A Sn—Ag—Cu—Al—Ni alloy composition comprising (0.01-20)% Ag, (0.01-1)% Cu, (0.01-2)% Al, (0.01-4)% Ni, balanced with Sn.

In order to evaluate the benefits of Al and Ni doping of Sn—Ag—Cu alloys, it is useful to know the yield strength, the ductility, the solidus temperature, the liquidus temperature, and the pasty range of standard Sn—Ag—Cu alloys. Thus, referring to FIG. 1, there is shown a table including data of differential thermal analysis (DTA) and tensile testing for several standard Sn—Ag—Cu alloys.

In comparison to standard (un-doped) Sn—Ag—Cu alloys, the presently disclosed Al- and Ni-doped Sn—Ag—Cu alloy compositions exhibit greater softness to absorb mechanical impact, lower pasty range or even obtaining a eutectic composition for better soldering process yield, and improved mechanical properties and reliability of solder joints in an electronic devices. These benefits are exhibited by way of the following examples:

Example 1

The Doping Effect of Al and Ni on Sn-4Ag-0.5Cu (SAC405) Based Alloys

Figure 2:
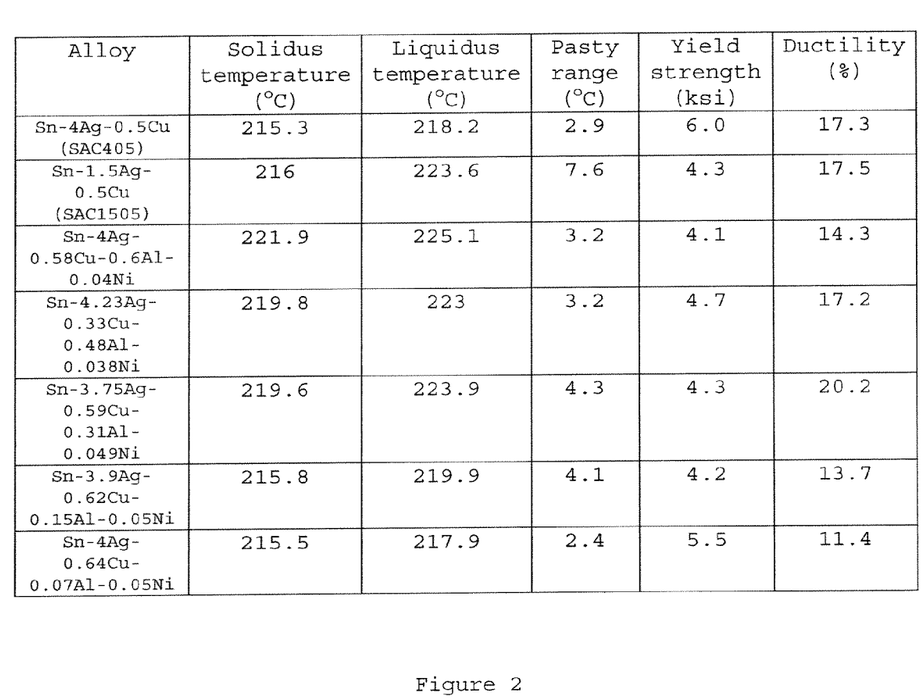
FIG. 2 is a table including data of differential thermal analysis (DTA) and tensile testing for two standard Sn—Ag—Cu alloys in addition to five Al- and Ni-doped Sn—Ag—Cu alloy compositions in accordance with various alloy embodiments of the present disclosure.

Referring to FIG. 2, there is shown a table including data of differential thermal analysis (DTA) and tensile testing for two standard Sn—Ag—Cu alloys in addition to five Al- and Ni-doped Sn—Ag—Cu alloy compositions. As shown in FIG. 2, the Al- and Ni-doped high Ag containing Sn-4Ag-0.5Cu (SAC405) based alloys (Al content: 0.6-0.07%) exhibits a 32-96 decrease of yield strength with respect to the un-doped SAC405 alloy. Also, with approximately 0.04-0.05% of Ni, the 0.15% Al-doped SAC405 alloys exhibit comparable yield strength and ductility to Sn-1.5Ag-0.5Cu (SAC1505), yet the liquidus temperature is approximately 4° C. lower.

These results clearly establish the fact that doping high Ag containing SAC alloys with trace amounts of both Al and Ni may result in very significant softening of the alloys (e.g., comparable softness to a low Ag containing SAC alloy). Also, these results show that doping high Ag containing SAC alloys with trace amounts of both Al and Ni does not diminish the benefits of using high Ag containing SAC alloys (e.g., small pasty range and greater creep and thermal fatigue resistance due to Ag containing particles). These results further show that the pasty range of Sn-3.9Ag-0.62Cu-0.15Al-0.05Ni is 4.1° C., which is significantly narrower than the pasty range of Sn-1.5Ag-0.5Cu (SAC1505) (i.e., 7.6° C.), a reduction of 3.5° C.

Example 2

The Effect of Al Concentration

Figure 3:
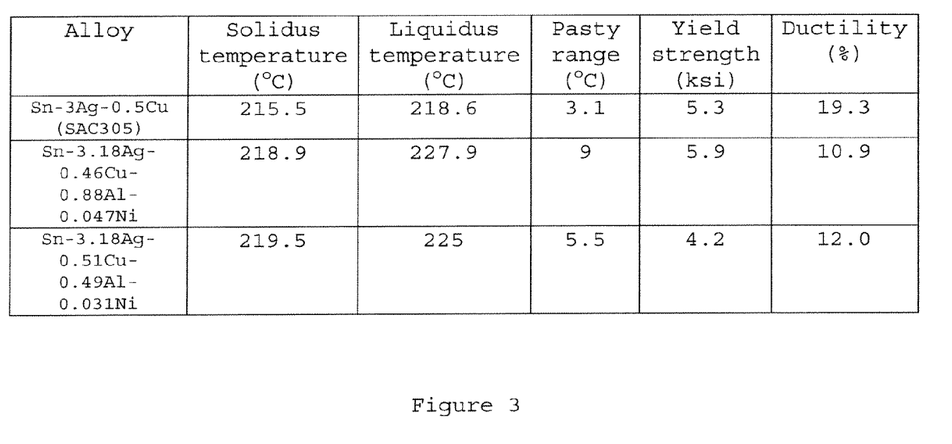
FIG. 3 is a table including data of differential thermal analysis (DTA) and tensile testing for a standard Sn—Ag—Cu alloy in addition to two Al- and Ni-doped Sn—Ag—Cu alloy compositions in accordance with various alloy embodiments of the present disclosure.

Referring to FIG. 3, there is shown a table including data of differential thermal analysis (DTA) and tensile testing for a standard Sn—Ag—Cu alloy in addition to two Al- and Ni-doped Sn—Ag—Cu alloy compositions. As shown in FIG. 3, as the concentration of Ag is reduced to 3.18%, doping SAC alloys with Ni and Al still results in a significant reduction in yield strength (i.e., approximately 21% reduction from the un-doped Sn-3Ag-0.5Cu (SAC305) to that of the Al- and Ni-doped Sn-3.18Ag-0.51Cu-0.49Al-0.031Ni).

With higher concentrations of Al doping (i.e., 0.88% Al), the yield strength, instead of being reduced as shown in Example 1, is not significantly lower than that of the un-doped Sn-3Ag-0.5Cu (SAC305) alloy. This indicates that Al is a softening and strengthening element for SAC alloys. The softening mechanism of Al appears to be most applicable when the Al doping concentration stays within a maximum allowable doping concentration (e.g., 0.49%). As the concentration of Al exceeds this maximum allowable Al concentration, the softening mechanism of Al to the SAC alloys appears to stop.

Example 3

The Effect of Ag Concentration

Figure 4:
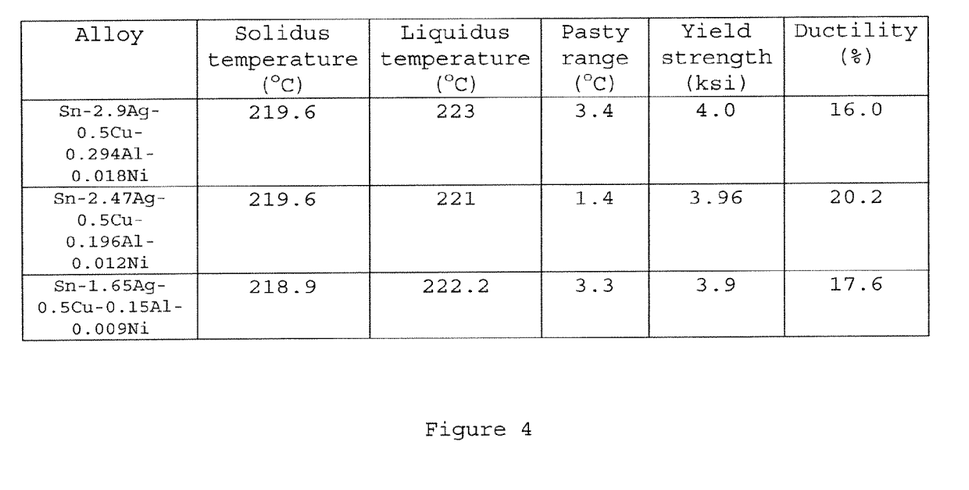
FIG. 4 is a table including data of differential thermal analysis (DTA) and tensile testing for three Al- and Ni-doped Sn—Ag—Cu alloy compositions in accordance with various alloy embodiments of the present disclosure.

Referring to FIG. 4, there is shown a table including data of differential thermal analysis (DTA) and tensile testing for three Al- and Ni-doped Sn—Ag—Cu alloy compositions. As shown in FIG. 4, when the concentration of Ag is further reduced from 2.9% to 1.65%, the extent of the reduction of the yield strength by the Al- and Ni-doping of Sn—Ag—Cu alloys is very small, indicating an optimum Ag concentration of SAC alloys which allows the softening effect to work.

Figure 1:
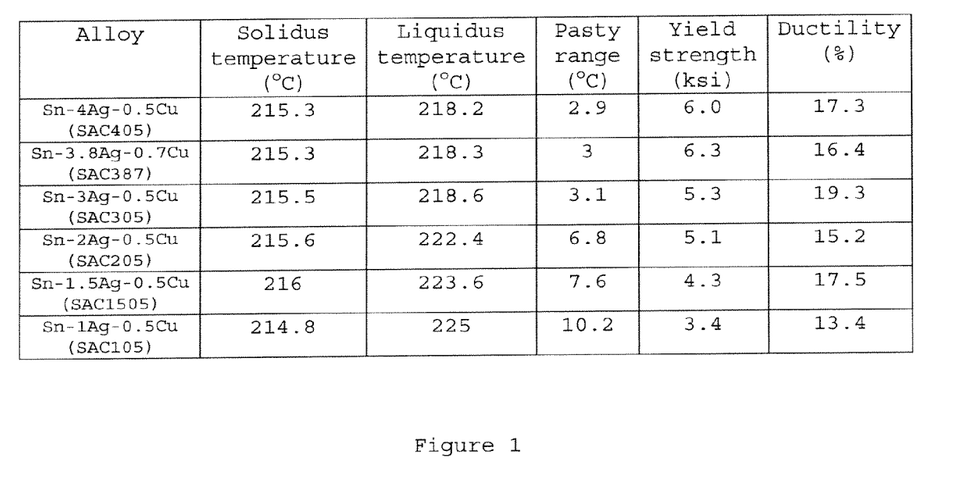
FIG. 1 is a table including data of differential thermal analysis (DTA) and tensile testing for several standard Sn—Ag—Cu alloys.

For example, as shown in FIG. 4, the yield strength of Sn-1.65Ag-0.5Cu-0.15Al-0.009Ni is 3.9 ksi, and the yield strength of Sn-1.5Ag-0.5Cu (SAC1505) is 4.3 ksi (see FIG. 1). That is, there is only about a 9% reduction in yield strength with 0.15% Al (i.e., 1500 ppm). Thus, it is clear that the effect of Al- and Ni-doping on reducing yield strength is more significant in high Ag containing (e.g., >2% Ag) Sn—Ag—Cu alloys than in lower Ag containing (e.g., <2% Ag) Sn—Ag—Cu alloys. In addition, it is significant that the Sn-2.47Ag-0.5Cu-0.196Al-0.012Ni alloy gives rise to the smallest pasty range possible (i.e., 1.4° C. among all the Sn—Ag—Cu based alloy compositions), indicating an eutectic composition of Sn—Ag—Cu—Al—Ni.

Example 4

The Effect of High Concentration of Doping of Al and Ni at 2%

Figure 5:
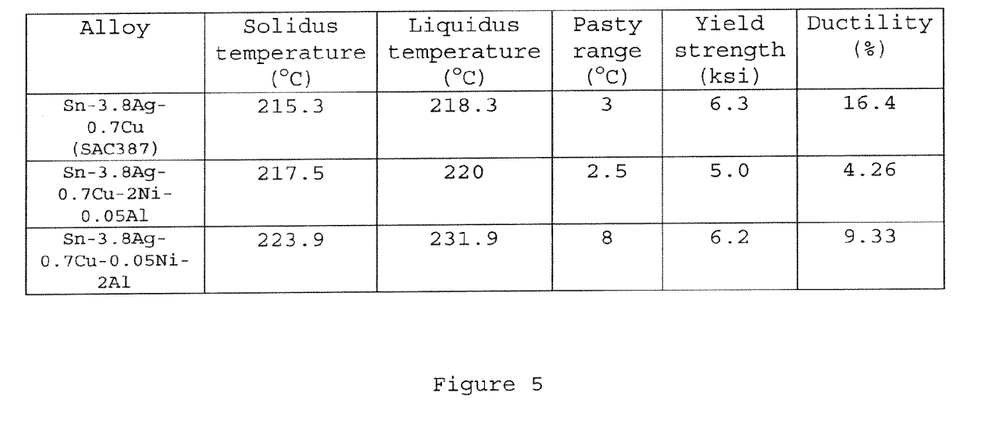
FIG. 5 is a table including data of differential thermal analysis (DTA) and tensile testing for a standard Sn—Ag—Cu alloy (SAC387) in addition to two Al- and Ni-doped Sn—Ag—Cu alloy compositions in accordance with various alloy embodiments of the present disclosure.

Referring to FIG. 5, there is shown a table including data of differential thermal analysis (DTA) and tensile testing for a standard Sn—Ag—Cu alloy (SAC387) in addition to two Al- and Ni-doped Sn—Ag—Cu alloy compositions. As shown in FIG. 5, when the SAC387 alloy is doped with high concentration of 2% Ni and low concentration of 0.05% Al, the yield strength of the alloy is reduced by 21%. This is surprising because, although Al has been found to react with Ag in solder alloys to result in softening of solder alloys, it is unexpected that such a high concentration of high strength and high temperature Ni particles (melting point=1455° C., yield strength=21000 psi), reduces the yield strength of the SAC387 alloy instead of forming $Ni_3Sn_4$ strengthening intermetallic particles. In addition, the liquidus temperature of this 2% Ni- and 0.05% Al-doped alloy is increased by only about 2° C.

In contrast, when the SAC387 alloy is doped with a high concentration of 2% Al and a low concentration of 0.05% Ni, the yield strength is about the same as that of the standard SAC387 alloy, but the liquidus temperature is greatly increased by 14° C. These results clearly show that, although a low concentration of Al-doping to the SAC387 alloy results in a significant reduction in yield strength, a high concentration of Al-doping (e.g., 2% Al) causes the SAC387 alloy to strengthen instead of soften.

Example 5

The Effect of Cu with Only Al Doping

Figure 6:
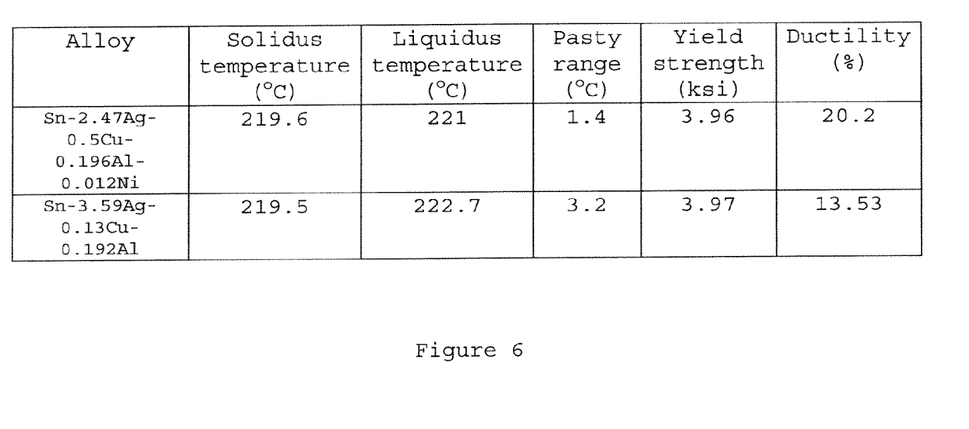
FIG. 6 is a table including data of differential thermal analysis (DTA) and tensile testing for an Al- and Ni-doped Sn—Ag—Cu alloy composition and an Al-doped Sn—Ag—Cu alloy composition in accordance with various alloy embodiments of the present disclosure.

Referring to FIG. 6, there is shown a table including data of differential thermal analysis (DTA) and tensile testing for an Al- and Ni-doped Sn—Ag—Cu alloy composition and an Al-doped Sn—Ag—Cu alloy composition. As shown in FIG. 6, even as the Cu concentration is reduced from 0.5% to 0.13%, with the same Al concentration of 0.192%, the yield strength of the high Ag-doped (i.e., 3.59% Ag) SAC alloy does not differ significantly from the low Ag-doped (i.e., 2.47% Ag) SAC alloy. Apparently, the strengthening effect of Cu compensates for a lower Ag concentration, which is the major strengthening factor of the SAC alloys.

The Microstructure of the Al- and Ni-Modified Sn—Ag—Cu Alloys.

Figure 7:
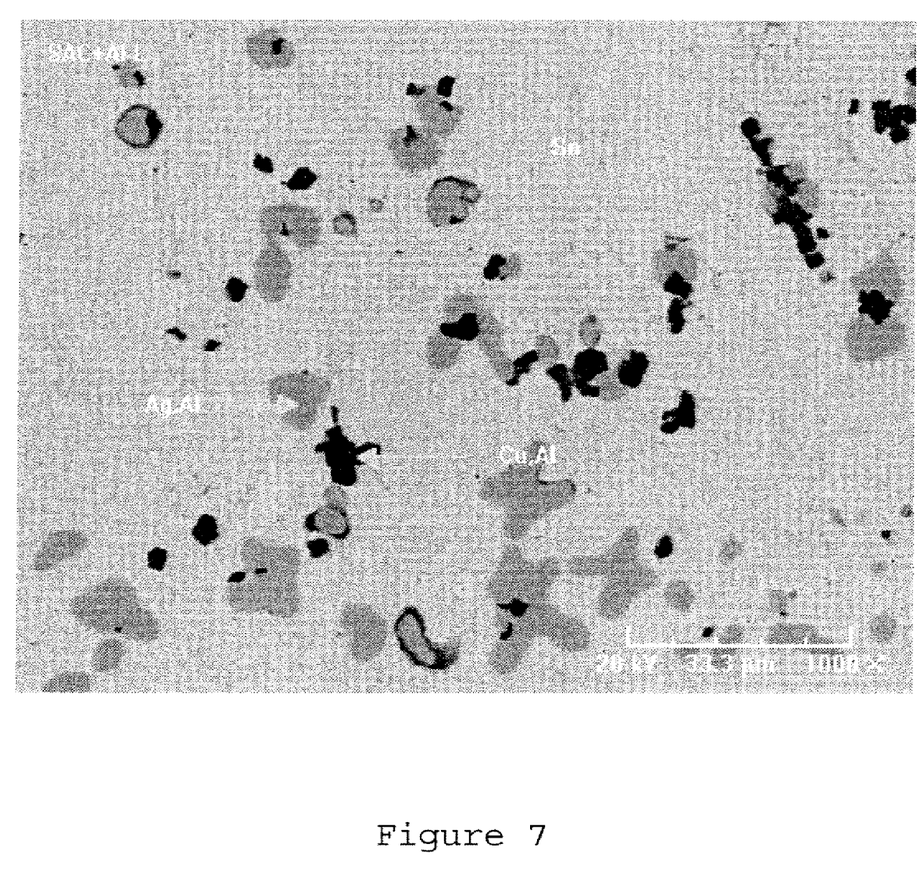
FIG. 7 shows a scanning electron micrograph for a Sn94.5Ag3.8Cu0.7Al1 alloy in accordance with an embodiment of the present disclosure.
Figure 8:
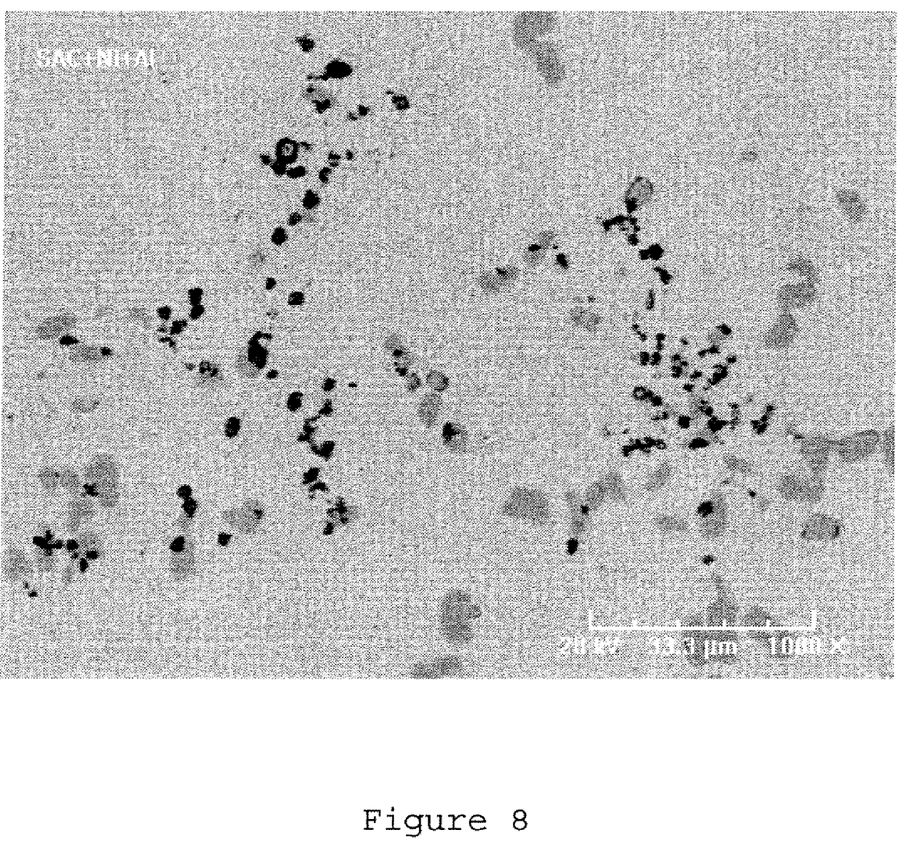
FIG. 8 shows a scanning electron micrograph for a Sn94.1Ag3.8Cu0.7Al0.6Ni0.04 alloy in accordance with an embodiment of the present disclosure.

In order to understand the unexpected effect of reducing the yield strength of the Sn—Ag—Cu alloys by doping with Al and Ni elements, it is helpful to realize the microstructure of the Al- and Ni-modified Sn—Ag—Cu alloys by employing scanning electron microscopy (SEM) with energy dispersive spectroscopy (EDS). Referring to FIG. 7, there is shown a scanning electron micrograph for a Sn94.5Ag3.8Cu0.7Al0.11 alloy. As shown in FIG. 7, the Al reacts with both Ag and Cu to form Al—Cu intermetallics (dark particles) and Al—Ag intermetallics (grey particles). Referring to FIG. 8, there is shown a scanning electron micrograph for a Sn94.1Ag3.8Cu0.7Al0.6Ni0.04 alloy. Similar to FIG. 7, as shown in FIG. 8, the Al reacts with both Ag and Cu to form Al—Cu intermetallics (dark particles) and Al—Ag intermetallics (grey particles). Thus, FIGS. 7 and 8 clearly indicate that typical $Ag_3Sn$ and $Cu_6Sn_5$ particles in Sn—Ag—Cu (SAC) alloys are replaced by the formation of Al—Ag and Al—Cu particles.

Figure 9:
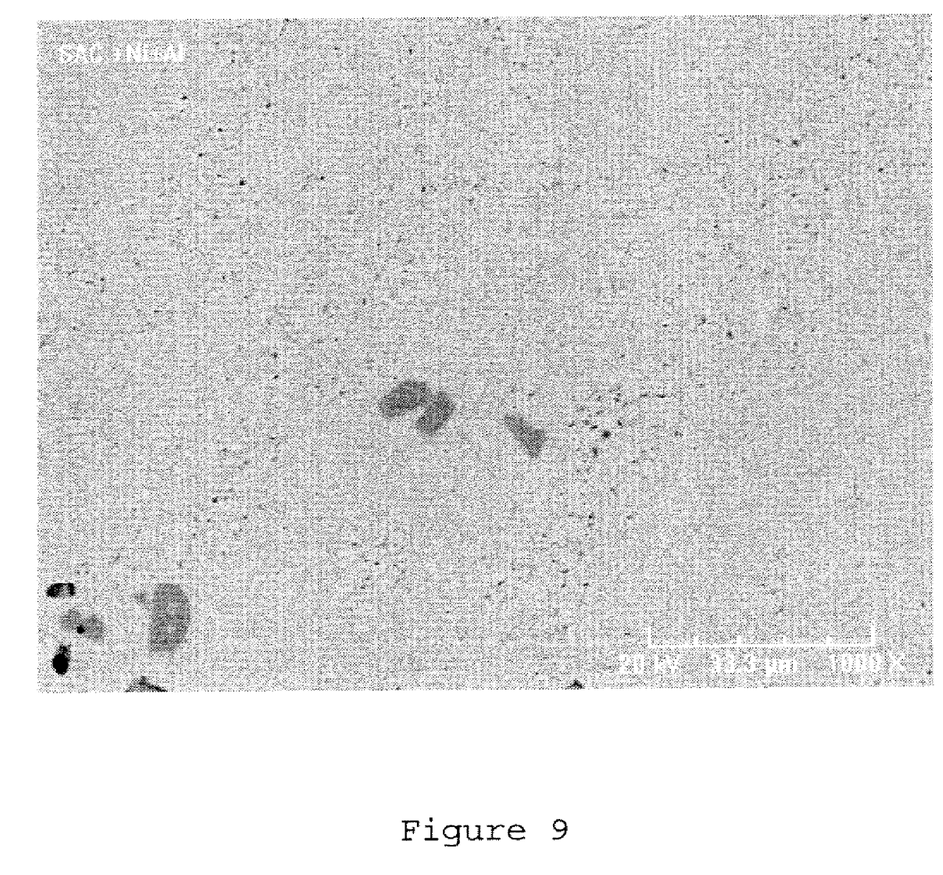
FIG. 9 shows a scanning electron micrograph for a standard Sn—Ag—Cu alloy.

Energy dispersive spectroscopy (EDS) identified these Al—Ag intermetallic particles to be $Ag_7Al_3$ and the Al—Cu intermetallic particles to be $(Cu,Sn)_{50}Al_{50}$. These $Ag_7Al_3$ and $(Cu,Sn)_{50}Al_{50}$ intermetallic particles in general are quite large: approximately 10-20 microns in size. In contrast, the typical $Al_3Sn$ and $Cu_6Sn_5$ particles are only about 1 micron or less in size, as shown in FIG. 9. It is well known that fine particles in alloys impede dislocation movements more efficiently, and produce an alloy with greater yield strength. When these fine particles grow in size, the yield strength decreases. In addition, when the coherency of particles within a matrix is gradually lost when particles grow, the yield strength is further decreased (see, George E. Dieter, "Mechanical Metallurgy", Chapter 6, page 222, 1976).

In light of the above-described mechanisms, in the presently disclosed alloys, fine $Ag_3Sn$ and $Cu_6Sn_5$ particles are replaced with larger $Ag_7Al_3$ and $(Cu,Sn)_{50}Al_{50}$ particles, thereby resulting in a reduction of strength in the presently disclosed alloys. That is, the yield strength of Sn—Ag—Cu alloys is significantly reduced when doped with Al. However, as Al concentration increases from about 0.1% (1000 ppm) to about 0.6%, as shown in Example 1, this reduction in yield strength becomes less dependent on increasing Al concentration. Also, as the number of $Ag_7Al_3$ particles increases with increasing Ag or Al, and the spacing between these particles decreases, dislocation movement is again retarded and yield strength is increased (see George E. Dieter, "Mechanical Metallurgy", Chapter 6, page 224, 1976).

Furthermore, very unexpectedly, Ni doping produces isolated islands of near pure Ni domains, instead of forming $Ni_3Sn_4$ particles as would be expected under conventional metallurgical wisdom, which may strengthen the resulting alloy. These near pure Ni domains, possibly a solid solution of Sn in Ni, being an FCC structure, which is different from a hexagonal structure of an Sn matrix, produce an incoherent boundary between the near pure Ni particles and the Sn matrix. The above-described mechanism allows dislocations to move across particles easily, and thus results in a further softening effect. In addition, to soften an alloy, Ni doping may refine intermetallic formations in an interface with a substrate during soldering, and even reduce the pasty range of the alloy, as shown in Example 4. Thus, because of the lower strength of these off-stoichiometric Al—Ag and Al—Cu particles, the strength of conventional Sn—Ag—Cu alloys is reduced.

In contrast to low Ag containing Sn—Ag—Cu alloys, where the number of $Ag_3Sn$ particles is greatly decreased due to the low concentration of Ag (e.g., SAC105), $Ag_7Al_3$ and $(Cu,Sn)_{50}Al_{50}$ particles in the presently disclosed Al-doped Sn—Ag—Cu alloys may impede grain growth and grain boundary sliding and improve creep and thermal fatigue performance of the alloys (see, George E. Dieter, "Mechanical Metallurgy", Chapter 13, page 478, 1976). Therefore, in contrast to a low Ag containing Sn—Ag—Cu alloy, which is soft and compliant but exhibits low creep and thermal fatigue resistance, the presently disclosed Al- and/or Ni-doped Sn—Ag—Cu alloys are not only soft and compliant but may also exhibit greater creep and thermal fatigue resistance. In light of the above-described observations and reasoning, it is reasonable to assume the same mechanisms to be equally effective for Sn—Ag alloys as well, because Cu is considered a relatively minor strengthening factor in determining yield strength, creep, and thermal fatigue resistance of a standard Sn—Ag—Cu alloy, which usually consists of less than 0.7% Cu, as shown in Example 1.

At this point it should be noted that any of the presently disclosed Al- and/or Ni-doped alloys could be further doped with less than 0.1% by weight zinc (Zn), nickel (Ni), iron (Fe), cobalt (Co), antimony (Sb), palladium (Pd), platinum (Pt), manganese (Mn), rare earth elements, and combinations thereof, so as to refine interfacial intermetallic formation with Ni or Cu substrate and pads and to further improve the impact resistance. These rare earth elements may include cerium (Ce), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), and combinations thereof. However, when the dopant concentration is greater than 0.1%, the melting temperature of Sn—Ag and Sn—Ag—Cu alloys may increase drastically.

At this point it should be noted that any of the presently disclosed Al- and/or Ni-doped alloys could be further doped with less than 0.1% by weight an antioxidant such as, for example, germanium (Ge), phosphorus (P), and combinations thereof, to improve solder wetting performance. However, when the antioxidant dopant concentration exceeds 0.1%, soldering performance may suffer.

At this point it should be noted that any of the presently disclosed Al- and/or Ni-doped alloys could be further doped with less than 2.0% by weight bismuth (Bi), indium (In), and combinations thereof, to reduce a melting temperature of the alloy. However, greater than 2.0% of the dopants could result in too much strengthening of the solders, thus defeating the purpose of Al- and/or Ni-doping.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A lead free solder alloy comprising from about 77.95% to about 99.5% by weight tin (Sn), from about 1.0% to about 20.0% by weight silver (Ag), and from about 0.48% to about 2.0% aluminum (Al), wherein at least a portion of the Al and at least a portion of the Ag are present in the alloy as an intermetallic comprising $Ag_7Al_3$.

2. The lead free solder alloy of claim 1, further comprising from about 0.01% to about 1.0% by weight copper (Cu).

3. The lead free solder alloy of claim 1, further comprising less than 0.1% by weight at least one dopant selected from the group consisting of zinc (Zn), nickel (Ni), iron (Fe), cobalt (Co), antimony (Sb), palladium (Pd), platinum (Pt), rare earth elements, and combinations thereof to refine interfacial intermetallic formation.

4. The lead free solder alloy of claim 3, wherein the rare earth elements are selected from the group consisting of cerium (Ce), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), and combinations thereof.

5. The lead free solder alloy of claim 1, further comprising less than 0.1% by weight at least one dopant selected from the group consisting of germanium (Ge) and phosphorus (P) to improve solder wetting performance of the alloy.

6. The lead free solder alloy of claim 1, further comprising less than 2.0% by weight at least one dopant selected from the group consisting of bismuth (Bi) and indium (In) to reduce a melting temperature of the alloy.

7. A lead free solder alloy comprising from about 76.95% to about 99.49% by weight tin (Sn), from about 1.0% to about 20.0% by weight silver (Ag), from about 0.01% to about 1.0% by weight copper (Cu), and from about 0.48% to about 2.0% by weight aluminum (Al), and further comprising from about 0.01% to about 0.05% by weight nickel (Ni), wherein at least a portion of the Al and at least a portion of the Ag are present in the alloy as an intermetallic comprising $Ag_7Al_3$.

8. The lead free solder alloy of claim 7, further comprising less than 0.1% by weight at least one dopant selected from the group consisting of zinc (Zn), iron (Fe), cobalt (Co), antimony (Sb), palladium (Pd), platinum (Pt), rare earth elements, and combinations thereof to refine interfacial intermetallic formation.

9. The lead free solder alloy of claim 8, wherein the rare earth elements are selected from the group consisting of cerium (Ce), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), and combinations thereof.

10. The lead free solder alloy of claim 7, further comprising less than 0.1% by weight at least one dopant selected from the group consisting of germanium (Ge) and phosphorus (P) to improve solder wetting performance of the alloy.

11. The lead free solder alloy of claim 7, further comprising less than 2.0% by weight at least one dopant selected from the group consisting of bismuth (Bi) and indium (In) to reduce a melting temperature of the alloy.

12. A lead free solder alloy comprising from about 77.95% to about 99.5% by weight tin (Sn), from about 1.0% to about 20.0% by weight silver (Ag), from about 0.48% to about 2.0% by weight aluminum (Al), and from about 0.01% to about 0.05% by weight nickel (Ni), wherein at least a portion of the Al and at least a portion of the Ag are present in the alloy as an intermetallic comprising $Ag_7Al_3$.

13. The lead free solder alloy of claim 12, further comprising less than 0.1% by weight at least one dopant selected from the group consisting of zinc (Zn), iron (Fe), cobalt (Co), antimony (Sb), palladium (Pd), platinum (Pt), rare earth elements, and combinations thereof to refine interfacial intermetallic formation.

14. The lead free solder alloy of claim 13, wherein the rare earth elements are selected from the group consisting of cerium (Ce), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), and combinations thereof.

15. The lead free solder alloy of claim 12, further comprising less than 0.1% by weight at least one dopant selected from the group consisting of germanium (Ge) and phosphorus (P) to improve solder wetting performance of the alloy.

16. The lead free solder alloy of claim 12, further comprising less than 2.0% by weight at least one dopant selected from the group consisting of bismuth (Bi) and indium (In) to reduce a melting temperature of the alloy.

17. A lead free solder alloy consisting essentially of from about 76.95% to about 99.49% by weight tin (Sn), from about 1.0% to about 20.0% by weight silver (Ag), from about 0.01% to about 1.0% by weight copper (Cu), from about 0.48% to about 2.0% by weight aluminum (Al), from about 0.01% to about 0.05% by weight nickel (Ni), and less than 0.1% by weight at least one dopant selected from the group consisting of zinc (Zn), iron (Fe), cobalt (Co), antimony (Sb), palladium (Pd), platinum (Pt), rare earth elements, and combinations thereof to refine interfacial intermetallic formation; wherein at least a portion of the Al and at least a portion of the Ag are present in the alloy as an intermetallic comprising $Ag_7Al_3$.

18. The lead free solder alloy of claim 17, further consisting essentially of more than 0% and less than 0.1% by weight at least one dopant selected from the group consisting of zinc (Zn), iron (Fe), cobalt (Co), antimony (Sb), palladium (Pd), platinum (Pt), rare earth elements, and combinations thereof to refine interfacial intermetallic formation.

19. The lead free solder alloy of claim 18, wherein the rare earth elements are selected from the group consisting of cerium (Ce), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), actinium (Ac), thorium (Th), protactinium (Pa), and combinations thereof.

20. The lead free solder alloy of claim 17, consisting of from about 76.95% to about 99.49% by weight tin (Sn), from about 1.0% to about 20.0% by weight silver (Ag), from about 0.01% to about 1.0% by weight copper (Cu), from about 0.48% to about 2.0% by weight aluminum (Al); from about 0.01% to about 0.05% by weight nickel (Ni); and less than 0.1% by weight at least one dopant selected from the group consisting of germanium (Ge) and phosphorus (P) to improve solder wetting performance of the alloy); wherein at least a portion of the Al and at least a portion of the Ag are present in the alloy as an intermetallic comprising $Ag_7Al_3$.

21. The lead free solder alloy of claim 17, consisting of from about 76.95% to about 99.49% by weight tin (Sn), from about 1.0% to about 20.0% by weight silver (Ag), from about 0.01% to about 1.0% by weight copper (Cu), from about 0.48% to about 2.0% by weight aluminum (Al); from about 0.01% to about 0.05% by weight nickel (Ni); and less than 2.0% by weight at least one dopant selected from the group consisting of bismuth (Bi) and indium (In) to reduce a melting temperature of the alloy; wherein at least a portion of the Al and at least a portion of the Ag are present in the alloy as an intermetallic comprising $Ag_7Al_3$.

22. The lead free solder alloy of claim 1, further comprising from about 0.01% to about 4.0% by weight nickel (Ni).

23. The lead free solder alloy of claim 2, further comprising from about 0.01% to about 4.0% by weight nickel (Ni).

24. The lead free solder alloy of claim 1, wherein all or substantially all of the Al is present in the alloy as an intermetallic comprising $Ag_7Al_3$.

25. The lead free solder alloy of claim 2, wherein all or substantially all of the Al is present in the alloy as an intermetallic comprising $Ag_7Al_3$ or $(Cu,Sn)_{50}Al_{50}$.

26. The lead free solder alloy of claim 7, wherein all or substantially all of the Al is present in the alloy as an intermetallic comprising $Ag_7Al_3$ or $(Cu,Sn)_{50}Al_{50}$.

27. The lead free solder alloy of claim 12, wherein all or substantially all of the Al is present in the alloy as an intermetallic comprising $Ag_7Al_3$.

28. The lead free solder alloy of claim 17, wherein all or substantially all of the Al is present in the alloy as an intermetallic comprising $Ag_7Al_3$ or $(Cu,Sn)_{50}Al_{50}$.

* * * * *